US008681171B2

(12) United States Patent
Kinch

(10) Patent No.: US 8,681,171 B2
(45) Date of Patent: Mar. 25, 2014

(54) METHOD FOR IDENTIFYING, DISPLAYING, SELECTING, NAMING AND MATCHING COLORS

(76) Inventor: Nicoline Kinch, Stockholm (SE)

( * ) Notice: Subject to any disclaimer, the term of this patent is extended or adjusted under 35 U.S.C. 154(b) by 554 days.

(21) Appl. No.: 13/007,076

(22) Filed: Jan. 14, 2011

(65) Prior Publication Data

US 2012/0050312 A1     Mar. 1, 2012

Related U.S. Application Data

(63) Continuation-in-part of application No. 12/985,369, filed on Jan. 6, 2011, now Pat. No. 8,558,843.

(60) Provisional application No. 61/377,193, filed on Aug. 26, 2010.

(51) Int. Cl.
*G09G 5/02* (2006.01)

(52) U.S. Cl.
USPC ........... 345/593; 345/591; 345/597; 345/598; 273/156; 273/157 R; 273/153 S; 434/98; 434/101; 434/104

(58) Field of Classification Search
USPC .................. 345/591, 593, 597, 598; 273/156, 273/157 R, 153 S; 434/98, 101, 104
See application file for complete search history.

(56) References Cited

U.S. PATENT DOCUMENTS

| | | | | |
|---|---|---|---|---|
| 640,792 | A | * | 1/1900 | Munsell ........................ 446/243 |
| 2,184,125 | A | * | 12/1939 | Patterson ...................... 434/104 |
| 4,169,285 | A | * | 9/1979 | Walker .......................... 345/591 |
| 4,377,286 | A | * | 3/1983 | Constantinescu .......... 273/153 S |
| 4,695,832 | A | | 9/1987 | Jacobson |
| 4,865,323 | A | | 9/1989 | Heusinkveld |
| 6,518,948 | B1 | * | 2/2003 | Berstis ......................... 345/107 |
| 6,924,817 | B2 | | 8/2005 | Rice et al. |
| 7,180,524 | B1 | | 2/2007 | Axelrod |
| 7,221,373 | B2 | | 5/2007 | Dornan et al. |

FOREIGN PATENT DOCUMENTS

WO      2009034401       3/2009

* cited by examiner

*Primary Examiner* — Xiao M. Wu
*Assistant Examiner* — Todd Buttram
(74) *Attorney, Agent, or Firm* — Fasth Law Offices; Rolf Fasth

(57) ABSTRACT

The method is for identifying and selecting a color or a combination of colors. A color sphere (200) is provided that has a first color pocket (238) defined between a first horizontal disc (202) and a second horizontal disc (208) and vertical inserts (212c, 212b) extending between the first horizontal disc and the second horizontal disc. The first horizontal disc has a plurality of organized first spectrum of color cells and the second horizontal disc has a plurality of organized second spectrum of color cells. The first spectrum is gradually lighter than the second spectrum and gradually more gray from a peripheral surface (209) towards an axial opening (232a) of the first horizontal disc and an axial opening (232b) of the second horizontal discs. A first color cell (236) is identified in a first pocket (238).

6 Claims, 4 Drawing Sheets

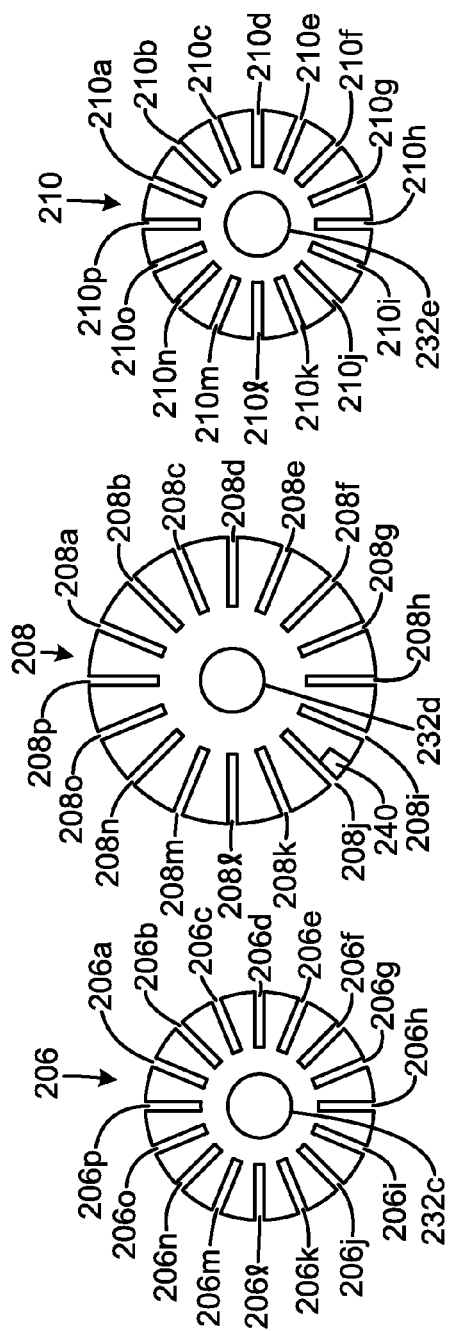
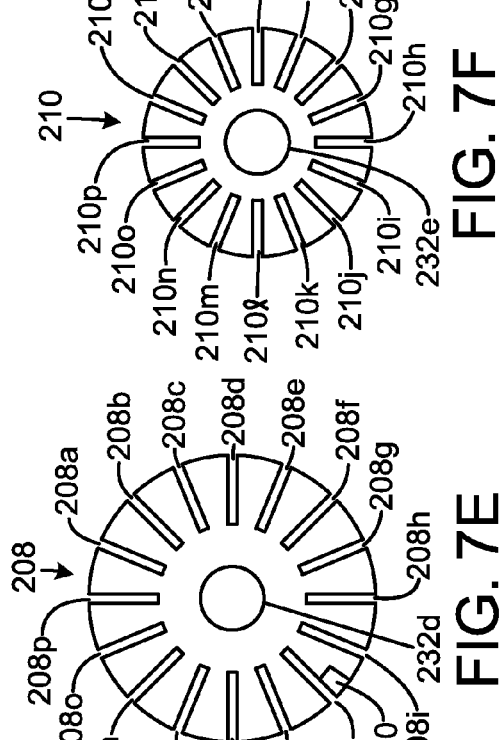
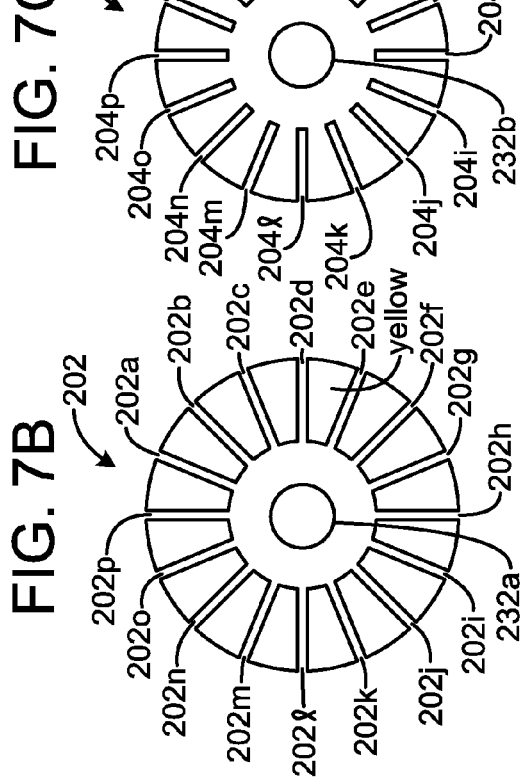
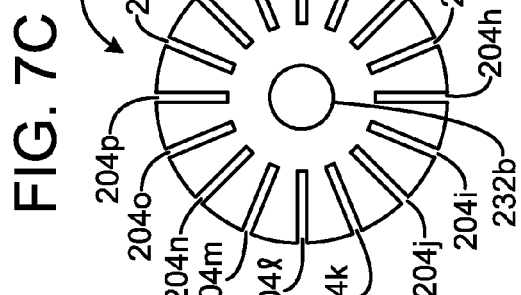
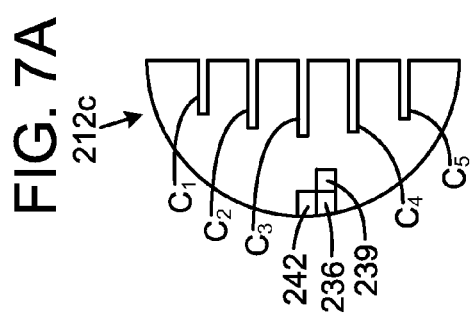

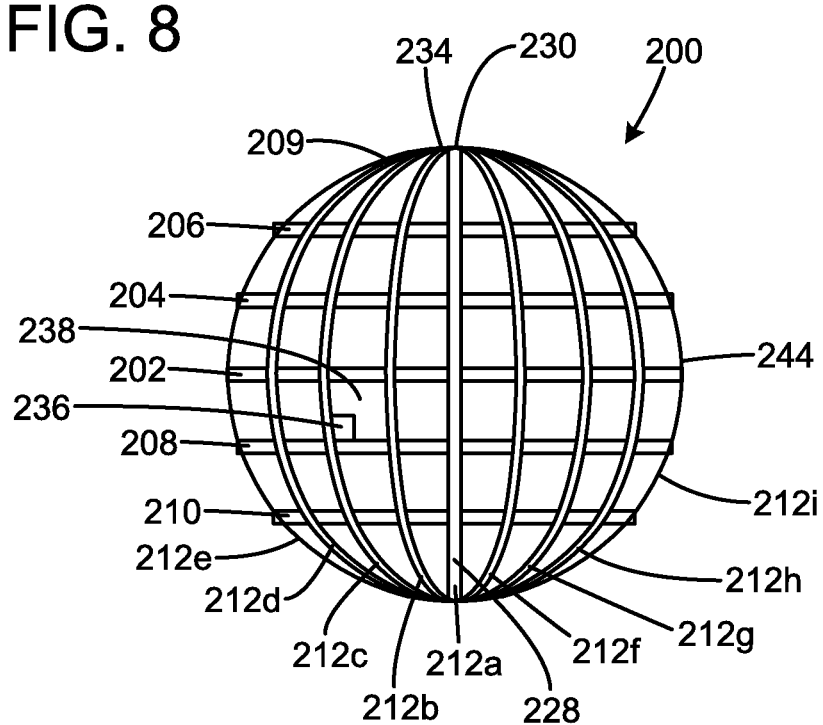
FIG. 8
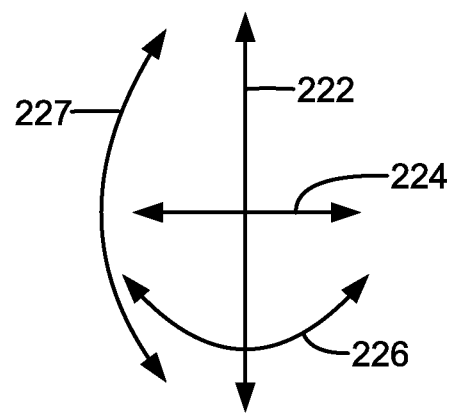

METHOD FOR IDENTIFYING, DISPLAYING, SELECTING, NAMING AND MATCHING COLORS

PRIOR APPLICATION

This application is a Continuation-In-Part Patent Application that claims priority from U.S. Utility patent application Ser. No. 12/985,369, filed 6 Jan. 2011 that claims priority from U.S. Provisional Patent Application Ser. No. 61/377,193, filed 26 Aug. 2010.

TECHNICAL FIELD

The invention relates to a method for identifying, displaying, selecting, naming and matching colors.

BACKGROUND OF INVENTION

Most people find it difficult to understand how colors relate to each other and identify and match colors. In schools, teachers find it difficult to make the students understand how colors relate. Another example is stores that sell paint have two-dimensional color maps that show many color shades from which the customers must select colors. However, it is difficult for customers to know why, for example, yellow appears on several different color samples and what the difference is between these different "yellows", and why a color in one color map matches a second color in a different color map. An often expressed problem among vendors of paint is that the customer has a tendency to choose colors that are too intense. They realize the mistake afterwards, when the paint has already been applied. No system is effective and it is difficult for people to match colors and understand how colors related to one another despite the various prior efforts.

SUMMARY OF INVENTION

The method of the present invention provides a solution to the above-outlined problems. More particularly, the method is a three-dimensional method for identifying, selecting and matching colors. It can be virtual as well as physical. With the help of a system of coordinates, any shade can be identified. The color sphere has a plurality of organized color cells so that the top of the sphere is white and the bottom is black. The most intense color shades of blue, yellow and red are disposed around the "equator" of the sphere. These three colors form a triangle when seen from above. The sphere may be cut in any way desired since all colors in the interior of the sphere are also organized so that they relate to each other. Towards the core the color shades become more grayish color shades while the color shades closer to the periphery of the sphere are gradually less gray. An axis through the sphere extends from the white top to the black bottom so that the shades therebetween gradually changes from white to various gray color shades that get darker until it is black. The sphere may be treated as having a plurality of color cells that gradually get lighter from a bottom to a top of the sphere and more gray as the color cells are disposed closer to the core axis of the sphere.

In operation, a first color cell may be selected from the color sphere. A radial direction, a horizontal peripheral direction and a vertical peripheral direction are identified relative to the first color cell. The color cells of the color sphere match in the radial, the horizontal peripheral and the vertical peripheral directions. A second color cell is selected when the second color cell is in selected direction. The color sphere is openable to display color cells disposed inside the sphere.

Additionally, the method is for identifying and selecting a color or a combination of colors. A color sphere is provided that has a first color pocket defined between a first horizontal disc and a second horizontal disc and vertical inserts extending between the first horizontal disc and the second horizontal disc. The first horizontal disc has a plurality of organized first spectrum of color cells and the second horizontal disc has a plurality of organized second spectrum of color cells. When disposed more towards the "north pole", the first spectrum is gradually lighter than the second spectrum and gradually more gray from a peripheral surface towards an axial opening of the first horizontal disc and an axial opening of the second horizontal discs. A first color cell is identified in a first pocket.

BRIEF DESCRIPTION OF DRAWINGS

FIG. 7a is a side view of a vertical insertion of the present invention;

FIG. 7b is a top view of a horizontal disc of the present invention;

FIG. 7c is a top view of a horizontal disc of the present invention;

FIG. 7d is a top view of a horizontal disc of the present invention;

FIG. 7e is a top view of a horizontal disc of the present invention;

FIG. 7f is a top view of a horizontal disc of the present invention; and

FIG. 8 is a side view of an assembled sphere of the present invention.

DETAILED DESCRIPTION

Figure 1:
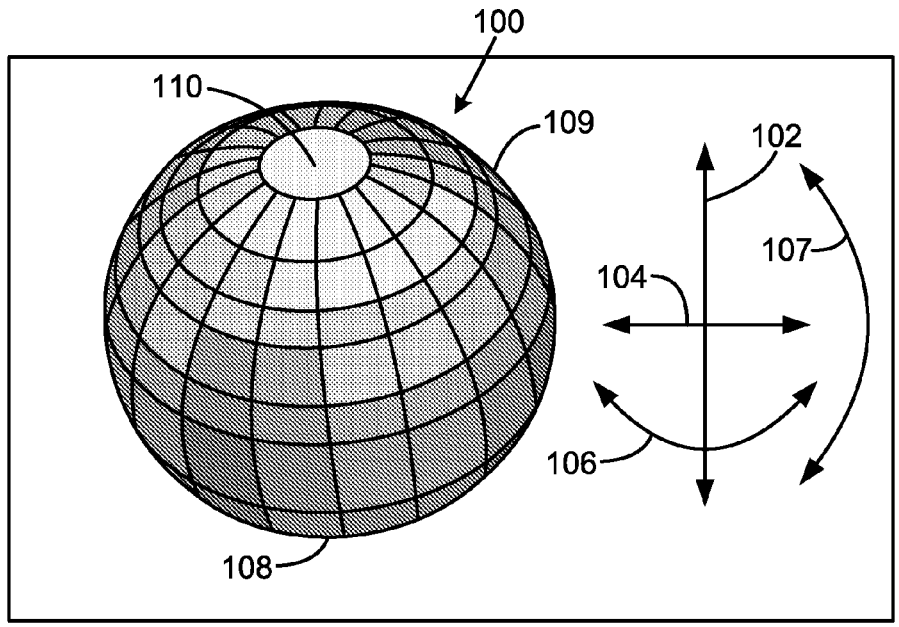
FIG. 1 is a schematic illustration of a portion of a color sphere of the present invention.

With reference to FIG. 1, the color sphere 100 of the present invention has a plurality of color cells or color shades that are organized. The color sphere 100 may also be virtual so that the user can easily "open up" the sphere to go inside the sphere by using a computer program. In this way, the user may effortlessly move inside the sphere to search for and identify the desired color shades. Preferably, the color cells are based on and organized according to three or triangular based colors namely yellow, red and blue. The change of the color change may also be continuous so that distinct color cells cannot be seen. The color sphere may be taken apart so that color cells disposed inside the sphere 100 are visible also. The sphere 100 has a peripheral surface 109 and all the visible colors organized in an axial direction 102, a radial direction 104, a horizontal peripheral direction 106 and a vertical peripheral direction 107. The color shades get lighter from a bottom 108 towards a top 110 of the sphere 100. An important and surprising realization or insight of the present invention is that colors match or are in harmony when they are disposed along the axial direction 102, the radial direction 104, the horizontal peripheral direction 106 and the vertical peripheral direction 107 relative to one another but not in any other direction. In other words, the color cells are organized in the sphere 100 so that by selecting one color shade the user may find another matching color shade by simply moving in the axial direction 102, the radial direction 104, the horizontal peripheral direction 106 or the vertical peripheral direction 107 to select another color shade in order to identify a color shade that matches the first selected color shade. It is of course also possible to find colors that are not in harmony with or match one another by using directions other than the directions 104, 106 and 107.

Figure 2:
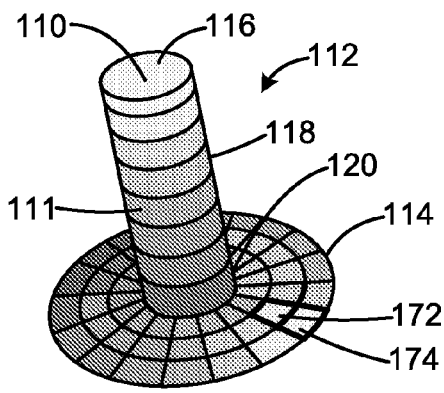
FIG. 2 is a schematic perspective top view of an axial portion of the color sphere of the present invention.

FIG. 2 is a perspective top view of an axial portion 112 including the core 111 of the sphere 100 that includes a bottom 114. The color shades of the axial portion 112 are organized so that they gradually change from a white shade 116 at the top 110 via gray shades 118 to a black shade 120 at the bottom 108 of the axial portion 112.

Figure 3:
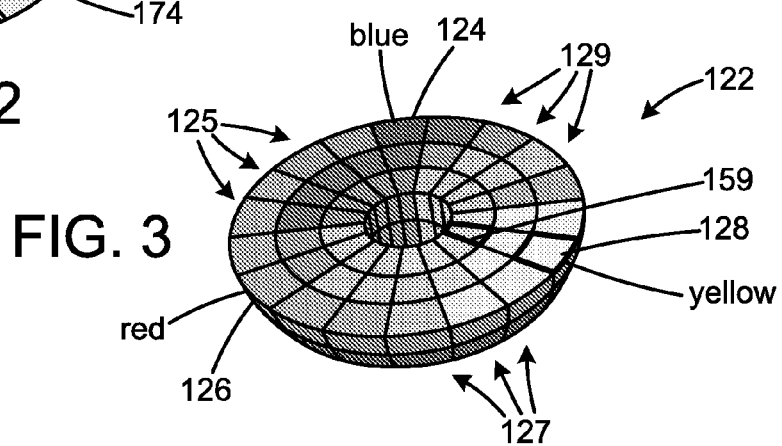
FIG. 3 is a schematic perspective top view of a lower segment of the color sphere of the present invention.

FIG. 3 is a perspective top view of a lower segment 122 disposed close to the bottom of the sphere 100 but above the bottom 114 shown in FIG. 2. The lower segment 122 has many color cells including a cell of a blue shade 124 and the color cells gradually change to a red shade 126 that gradually change to a yellow shade 128 along the horizontal peripheral direction 106. Similarly, the cells between the yellow shade 128 gradually change from the yellow shade 128 to the blue shade 124 in the direction 106. In this way, the color cells between the blue shade 124 and the yellow shade 128 are various shades of greenish colors 129 and the color cells between the blue shade 124 and the red shade 126 are various shades of purplish colors 125. Similarly, the color cells between the red shade 126 and the yellow shade 128 are various shades of orange colors 127. The colors between the orange and the black are various shades of brown. The same principle applies to color cells disposed closer to the core 111 in that they consists of more and more gray. The only difference of the color shades of the color cells between the visible top layer and the layers below the top layer is that the color shades in the lower levels are gradually darker as the layers get closer to the bottom black 114.

Figure 4:
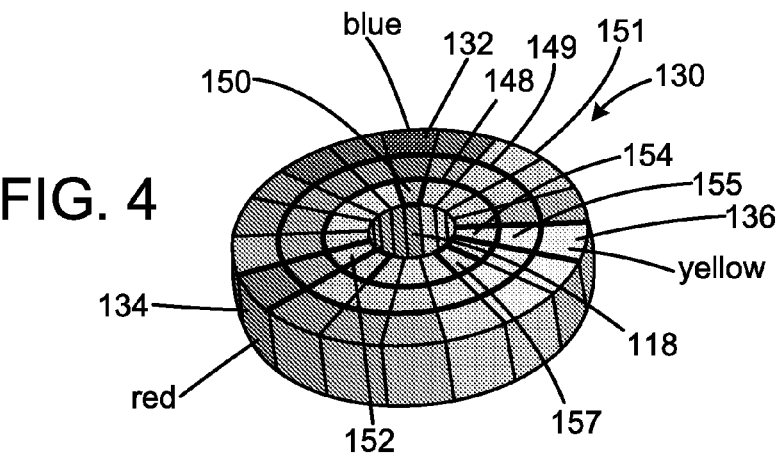
FIG. 4 is a schematic perspective top view of a mid-segment of the color sphere of the present invention.

FIG. 4 is a perspective top view of mid-segment 130. The outer periphery or the "equator" of the sphere 100 has the most intense colors. Similar to the bottom segment 122, the mid-segment 130 has many color cells including a blue shade 132, red shade 134 and a yellow shade 136. The blue shade 132 is slightly lighter than the blue shade 124 of the bottom segment 122 since the shades gradually change from darker shades at the bottom 108 to lighter shade at the top 110 of the entire sphere 100. The red shade 134 is therefore slightly lighter than the red shade 126 and the yellow shade 136 is slightly lighter than the yellow shade 128 of bottom segment 122. The inner wheel-shaped segment 148 has more of gray color shades than does the color shade in cell 149. However, the color shade 150 is a grayish/bluish shade because the peripheral cell 132 is blue. The color shade 152 includes a reddish gray because the peripheral cell 134 is red. Similarly, the color shade 154 includes a yellowish shade because the peripheral cell 136 is yellow. The same principle applies to all the color cells in the other segments such as the middle wheel-shaped segment 149 and the outer peripheral wheel-shaped segment 151. All horizontal peripheral "wheels" 106, such as like cells 149, 151 and 163 contain the same amount of gray and therefore match each other.

All the shades in the radial direction 104 also match one another. This means, for example, that all the color shades disposed radial direction extending from the color cell 144 towards color cell 161 match one another even when extended into the purple zone of color cells disposed on the other side of the core.

Figure 5:
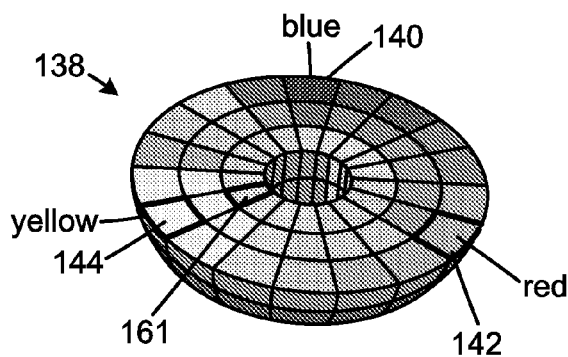
FIG. 5 is a schematic perspective bottom view of an upper segment of the color sphere of the present invention.

FIG. 5 is a bottom view of a top segment 138 that, in general, have lighter colors than the middle segment 130. The top segment 138 also has a lighter blue shade 140, a lighter red shade 142 and a lighter yellow shade 144 and various color shades therebetween, as explained above.

Figure 6:
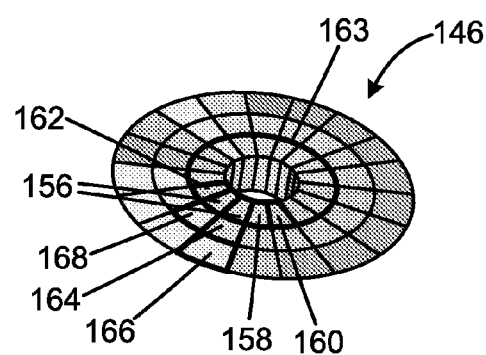
FIG. 6 is a schematic perspective bottom view of a top segment of the color sphere of the present invention.

FIG. 6 is a bottom view of a top 146 that has very light color shades but is organized in the same way as the segments 122, 130 and 138. As mentioned above, the important realization of the present invention is that certain color shades are in harmony or match while other color shades are not in harmony and that the matching colors can easily be found by moving in the directions 102, 104, 106 or 107 from the first selected color cell. For example, color cell 156 matches any other color in the peripheral direction 106 (see FIG. 1) so that color cell 156 are in harmony with and matches color cells 158, 160 and 162 and all the other color cells in the inner wheel-shaped segment 163. Color cell 156 is also in harmony color cells in the radial direction 104 (see FIG. 1) so that color cell 156 matches the color cells 164 and 166. However, color cell 156 is not in harmony with color cell 168 because color cell 168 is neither in the radial direction 104 nor in the peripheral direction 106 relative to color cell 156. It should be noted that color cell 156 is matching the corresponding cell of the top segment 138 in the vertical peripheral direction 107.

Colors are also in harmony and match one another in the axial direction 102. This means all the colors from the white shade 116 to the gray shades 118 and black shade 120 matches one another. The color shade 120 also matches, for example, all the color shades in the radial direction 104 such as color shades 172 and 174. In fact, the dark gray color shade 120 matches all the color shades in all the radial directions from the center and radially outwardly towards the periphery of the bottom 114.

In operation, the user may first select or identify color cell 154 in FIG. 4. In order to find a matching color the user may simply select any color in the radial direction 104, such as the color shade of color cell 155 or color cell 136, in the horizontal peripheral direction 106, such as color cell 157, or in the vertical peripheral direction 107, such as the yellowish color cell 159 shown in FIG. 3 or the yellowish color cell 161 shown in FIG. 5. It should be understood that any other color in the direction 104, 106 or 107 would be in harmony or match color cell 154. In this way, it is very easy for the user to select matching colors even if the colors are disposed far away from the selected color cell 154 in the sphere 100. The color sphere 100 of the present invention thus prevents the user from selecting mismatching colors i.e. color cells that are not disposed along any of the directions 102, 104, 106 or 107 relative to the first selected color shade used as the reference.

It is also possible to use the sphere 100 of the present invention as a learning tool to learn about colors and there relationships to one another. For example, it is possible to better understand what an apricot color consists of such as white plus yellow-red and how it relates to other color such as pink which may contain the same amount of white and red but no yellow. Brown may include the same amount of yellow-red and some black but no white etc. The sphere 100 may also be used as a three-dimensional puzzle wherein each piece may characterize a color shade. The pieces could be held together mechanically by fasteners or magnetism.

The sphere 100 may also be used to avoid the mistake of selecting a color that is too intense. For example, when a customer in a paint store has selected a color that, in the opinion of the sales clerk who may be more of an expert than the customer, is too intense, the sales clerk can easily recommend a color that is less intense by, for example, selecting a color in a radial inward direction. Of course, more intense colors may be selected by finding a color shade in the radial outward direction.

FIGS. 7A-7F and FIG. 8 are schematic views of an alternative embodiment. In general, the user may look inside the sphere of the alternative embodiment to see and better understand how the color shades relate to one another even when the sphere is fully assembled. The sphere provides for improved understanding and knowledge about colors and how they relate to one another. The sphere has all the color shades organized in a systematic and logical way so that the user may easily identify, select, store, compare and match colors.

The sphere may, also easily be disassembled so that the user can see and compare color shades on each disc or insertion, as explained below. The operation of the alternative embodiment is identical to the embodiment explained above except that the alternative embodiment also enables the user to find color shades inside pockets of the sphere i.e. to find color shades in directions of all the three dimensions (without having to open the sphere).

Additionally, the spectrum of color shades and the position of each color shade of the alternative embodiment is virtually identical to the embodiment shown in sphere 100. In general, as seen from above the color shades of the color spectrum of the sphere of the alternative embodiment gradually change in the clockwise direction from blue towards yellow and from yellow towards red and from red towards blue to complete the circle. Seen from the side, the color shades of the sphere gradually change from a black color at the bottom of the sphere towards a white color at the top of the sphere. The most intense colors are located at the periphery such as the "equator" of the sphere. The sphere and its components are explained in detail below. The number of discs, grooves and insertions used may be changed and the version shown in FIGS. 7-8 is only an illustrative example.

With reference to FIGS. 7-8, a sphere 200 may contain a plurality of discs such as horizontal discs 202, 204, 206, 208 and 210. The discs have different sizes in order to form the round shape of the sphere 200 when assembled. Preferably, discs 206 and 210 have the same size. Similarly, discs 204 and 208 have the same size while disc 202 has the largest diameter and form the "equator" of the sphere 200. More particularly, disc 202 has grooves 202a-202p, disc 204 has grooves 204a-204p, disc 206 has grooves 206a-206p, disc 208 has grooves 208a-208p, and disc 210 has grooves 210a-210p. The grooves are aligned so that vertical semi-circular insertions 212a-212p may be inserted into the aligned grooves 202a-202p, 204a-204p, 206a-206p, 208a-208p, 210a-210p to form the sphere 200 shown in FIG. 8.

A side view of insertion 212c is shown in FIG. 7A. Preferably, the insertions 212a, 212b and 212d-212p have identical shapes compared to the shape of insertion 212c. Only the color shades of the various insertions change but not the size or shape, as explained below. Insertion 212c has grooves c1, c2, c3, c4 and c5. The groove c1 is adapted to receive disc 206, groove c2 to receive disc 204, groove c3 to receive disc 202, groove c4 to receive disc 208 and groove c5 to receive disc 210. More particularly, insertion 212c is inserted into groove 202j of disc 202, groove 204j of disc 204, groove 206j of disc 206, groove 208j of disc 208 and groove 210j of disc 210. The other insertions are inserted into the grooves of the discs in a similar way until the sphere 200 is formed as shown in FIG. 8.

FIG. 8 only shows insertions 212a-212i but the insertions 212j-212p in the back of the sphere are identical to insertions 212a-212i except for the color shades. It should be understood that the exact number of discs and insertions used may vary and the embodiment shown in FIGS. 7-8 is only an illustrative example of an embodiment. Also, the exact shape of the discs and insertions may vary, although, when assembled, they always form a sphere.

Similar to sphere 100, the sphere 200 may have a peripheral surface 209 and all the visible colors are organized in an axial direction 222, a radial direction 224, a horizontal peripheral direction 226 and a vertical peripheral direction 227. In general, the color shades get lighter from a bottom 228 towards a top 230 of the sphere 200. The color shades with the greatest intensity are placed along a mid-segment 244 (the "equator") of the sphere 200. Colors match for instance when they are disposed along the axial direction 222, the radial direction 224, the horizontal peripheral direction 226 and the vertical peripheral direction 227 relative to one another. The sphere has a three-dimensional continuum of colors that may include an indefinite number of color cells so that the user may select suitable colors in any of the direction outlined above. If the user moves inwardly into the sphere the colors will include more gray and if the user moves upwardly or downwardly the colors will include more white or black, respectively.

It is also possible for the user to disassemble the sphere 200 to better see and compare color shades on each insertion and/or disc. For example, the user may simply pull out one of the insertions from the grooves to better see the color shades while the sphere 200 remains assembled or held together by the other discs and insertions.

It is also possible but not necessary to include round openings 232a, 232b, 232c, 232d and 232e in the discs 202-210, respectively so that a round axial opening 234 extends through the entire sphere 200 in the middle thereof. When so, it is important that the insertions 212a-212p are shaped so as not to extend into the axial opening 234 when the sphere 200 is assembled. The axial opening 234 permits light to go through the sphere 200 and makes it easier to see all the color shades with the same or similar light intensity regardless of where the color shade is located inside the sphere 200. The shape and size of the round opening 234 could be equivalent to the gray core 111 of the sphere 100. A "pillar" of the various greys, from white to black, could also be part of such an embodiment of sphere 200.

As mentioned above, the insertions 212a-212p have different color shades compared to one another. As shown earlier in, for example, FIG. 4, the color shades gradually vary or change from a red color shade for the insertion 212c inserted in, grooves 202j-210j and the insertions gradually change towards a blueish color shade of the insertion inserted into, grooves 202o-210o that in turn gradually change to a yellow color shade of the insertion 212h inserted into, grooves 202d-210d. As mentioned earlier, the color shade of each insertion also change from a dark or black color shade close to the bottom 228 to a light or white color shade close to the top 230 of the sphere. In other words, the change of the color shades is substantially similar to the change of color shades of the sphere 100 described in detail above.

One important advantage of the present invention is that the user may look inside the sphere 200 and easily see how the colors relate to one another even when the sphere 200 is fully assembled.

It is also possible to computerize the sphere in a computer program so that a digitalized version of the sphere can be viewed and turned in any way on a computer and/or a smartphone app screen. The user can rotate the sphere, "dive" into the inside of the sphere (i.e. zoom into and out of) identify and have the name of any color and select colors that match. It may also be possible to select a color without matching the color with another color. The user may make color conversions between different color systems and may also save and email a selected color to another. The program may also include an information section with instructions about how the sphere and the color segments work and how to use the application of the computer program. It may also be possible to take a photo of a color segment and use the computer system to match or identify the color segment among the color segments of the sphere. The computer program may also be used to determine if several colors taken by a camera match or not by identifying the colors among the color segments in the sphere and then determine if the identified color segments match one another.

In operation, the user may first select or identify a color cell in FIG. 8 such as a color cell 236 inside a pocket 238 of sphere 200. In order to find a matching color the user may for instance simply select any color in the radial direction 224, such as the color shade of color cell 239. In the horizontal peripheral direction 226, the user may select the color shade of color cell 240 on disc 208 and/or any color shade with a similar position on other insertions. In the vertical peripheral direction 227, the user may select the color shade of color cell 242 (see FIG. 7A). In this way, it is very easy for the user to see the relations between one color and other colors and select matching colors even if the colors are disposed far away from the selected color cell 236 in the sphere 200. As indicated above, since the sphere 200 includes a plurality of pockets such as pocket 238, the user can also easily select color shades inside the sphere 200 without having access to a virtual sphere that may be opened up by using a computer program.

Similar to FIG. 4 and as mentioned above, the color shades of each disc 202-210 gradually change in the clockwise direction from a blue color towards yellow and from yellow the color towards a red color and from the red color back towards the blue color. Each color shade is not shown in FIGS. 7A-7F for clarity. However, all the color shades of each color cell between these colors are disposed on each disc similar to the views shown in FIGS. 4-5. In other words, the relationship and logical continuum of color shades of disc 202 could be identical to the color shades shown in FIG. 4 and the only difference is that disc 202 has grooves to receive the insertions. The color shades of disc 210 are generally darker than the corresponding color shades on disc 208 that in turn are generally darker than discs 202, 204 and 206 as the color shades become gradually lighter towards the top 230 of the sphere 200. In this way, the sphere 200 provide an effective tool to easily select a color and identify other matching colors while also making it easier for the user to understand how colors related to another. The physical embodiment as well as the computerized version of the sphere may also be provided as a puzzle so that the user may use the sphere as a pedagogical tool to better understand the relationship between different color shades while assembling the puzzle. It can also be provided in simpler versions, such as a sphere that cannot be opened and/or in versions to be colored by the user herself.

While the present invention has been described in accordance with preferred compositions and embodiments, it is to be understood that certain substitutions and alterations may be made thereto without departing from the spirit and scope of the following claims.

The invention claimed is:

1. A method for constructing a physical color sphere device and identifying and selecting a color or a combination of colors, comprising:

providing a first horizontal disc, the first horizontal disc having a plurality of first grooves defined along a first outer periphery of the first horizontal disc, providing a second, third, fourth and fifth horizontal disc, the second, third, fourth and fifth horizontal discs having second, third, fourth and fifth grooves defined along a second, third, fourth and fifth periphery of the second, third, fourth and fifth discs, respectively, the first horizontal disc having a first radius, the second, third, fourth and fifth horizontal discs having a second, third, fourth and fifth radius, respectively, the first radius being greater than the second and third radius, the second radius being identical to the third radius, the second radius being greater than the fourth and fifth radius, the fourth radius being identical to the fifth radius, providing a first vertical insertion, the first vertical insertion being a half-circle having a first round outer surface and a first straight outer surface, the first straight outer surface having first, second, third, fourth and fifth grooves defined therein, inserting the first groove of the first vertical insertion into one of the first grooves of the first horizontal disc, inserting one of the grooves of the second, third, fourth and fifth horizontal discs into the second, third, fourth and fifth grooves of the first vertical insertion so that the second horizontal disc is above the first horizontal disc, the third horizontal disc is below the first horizontal disc, the fourth horizontal disc is above the second horizontal disc and the fifth horizontal disc is below the third horizontal disc, the first horizontal disc having a plurality of organized first spectrum of color cells and the second horizontal disc having a plurality of organized second spectrum of color cells, the first spectrum being darker than the second spectrum, the first and second horizontal discs being gradually more gray from a peripheral surface towards a first mid-point of the first horizontal disc and a second mid-point of the second horizontal disc, respectively, the first horizontal disc being axially spaced apart from the second horizontal disc, the third, fourth and fifth horizontal disc having third, fourth and fifth spectrums, respectively, organizing the color cells of the horizontal discs so that the colors cells only match in a radial direction, horizontal peripheral direction and in a vertical peripheral direction, the radial direction being a direction that is perpendicular to an axial direction, providing the first horizontal disc with a plane surface being perpendicular to the axial direction, the first horizontal disc having an inner wheel-shaped segment, a middle wheel-shaped segment surrounding the inner wheel-shaped segment, and an outer peripheral wheel-shaped segment surrounding the middle wheel-shaped segment, the inner wheel-shaped segment having color cells with the first amount of gray, the middle wheel-shaped segment having color cells with the second amount of gray and the outer peripheral segment having color cells with the third amount of gray, the first amount being greater than the second amount, the second amount being greater than the third amount, aligning the first, second, third, fourth and fifth horizontal discs so that the color cells of each horizontal disc match in the axial direction, inserting vertical insertions into all grooves of the first, second, third, fourth and fifth horizontal discs to form a color sphere having pockets defined between the horizontal discs and the vertical inserts, looking into a first color pocket and identifying a first color cell of the second horizontal disc inside the first color pocket, and identifying a second color cell of the first horizontal disc, the second color cell being axially aligned with the first color cell, the second color cell having an amount of gray that is identical to an amount of gray of the first color cell, the second color cell having a color shade that is identical to a color shade of the first color cell, the first color cell being lighter than the second color cell.

2. The method according to claim 1, wherein the method further comprises the steps of selecting a second color cell.

3. The method according to claim 1 wherein the method further comprises the step of placing a white shade at a top and a black shade at a bottom of the color sphere.

4. The method according to claim 1 wherein the method further comprises the step of making the color sphere open with a plurality of pockets to display color cells disposed inside the peripheral surface within the color sphere.

5. The method according to claim 1 wherein the method further comprises the step of placing color shades having the greatest intensity in a mid-segment.

6. A method for constructing a physical color sphere device and identifying and selecting a color or a combination of colors, comprising:

providing a first horizontal disc, the first horizontal disc having a plurality of first grooves defined along a first outer periphery of the first horizontal disc, providing a second and third horizontal disc, the second and third horizontal discs having second and third grooves defined along a second and third periphery of the second and third discs, respectively, the first horizontal disc having a first radius, the second and third horizontal discs having a second and third radius, respectively, the first radius being greater than the second and third radius, the second radius being identical to the third radius, providing a first vertical insertion, the first vertical insertion being a half-circle having a first round outer surface and a first straight outer surface, the first straight outer surface having first, second and third grooves defined therein, inserting the first groove of the first vertical insertion into one of the first grooves of the first horizontal disc, inserting the second groove of the first vertical insertion into one of the grooves of the second horizontal disc and inserting the third groove of the first vertical insertion into one of the grooves of the third horizontal disc so that the second horizontal disc is above the first horizontal disc, the third horizontal disc is below the first horizontal disc, the first horizontal disc having a plurality of organized first spectrum of color cells and the second horizontal disc having a plurality of organized second spectrum of color cells, the first spectrum being darker than the second spectrum, the first and second spectrums being gradually more gray from a peripheral surface towards a first mid-point of the first horizontal disc and a second mid-point of the second horizontal disc, respectively, the first horizontal disc being axially spaced apart from the second horizontal disc, the third disc having a third spectrum, organizing the color cells of the horizontal discs so that the colors cells only match in a radial direction, horizontal peripheral direction and in a vertical peripheral direction, the radial direction being a direction that is perpendicular to an axial direction, providing the first horizontal disc with a plane surface being perpendicular to the axial direction, the first horizontal disc having an inner wheel-shaped segment, a middle wheel-shaped segment surrounding the inner wheel-shaped segment, and an outer peripheral wheel-shaped segment surrounding the middle wheel-shaped segment, the inner wheel-shaped segment having color cells with the first amount of gray, the middle wheel-shaped segment having color cells with the second amount of gray and the outer peripheral segment having color cells with the third amount of gray, the first amount being greater than the second amount, the second amount being greater than the third amount, aligning the first, second and third horizontal discs so that the color cells of each horizontal disc match in the axial direction, inserting vertical insertions into all grooves of the first, second and third horizontal discs to form a color sphere having pockets defined between the horizontal discs and the vertical inserts, looking into a first color pocket and identifying a first color cell of the second horizontal disc inside the first color pocket, and identifying a second color cell of the first horizontal disc, the second color cell being axially aligned with the first color cell, the second color cell having an amount of gray that is identical to an amount of gray of the first color cell, the second color cell having a color shade that is identical to a color shade of the first color cell, the first color cell being lighter than the second color cell.

* * * * *